(12) United States Patent
Lyu et al.

(10) Patent No.: US 11,614,598 B2
(45) Date of Patent: Mar. 28, 2023

(54) OPTICAL SYSTEM

(71) Applicant: Zhejiang Sunny Optical Co., Ltd., Ningbo (CN)

(72) Inventors: Saifeng Lyu, Ningbo (CN); Jianke Wenren, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 0 days.

(21) Appl. No.: 16/613,672

(22) PCT Filed: Sep. 20, 2018

(86) PCT No.: PCT/CN2018/106602
§ 371 (c)(1),
(2) Date: Nov. 14, 2019

(87) PCT Pub. No.: WO2019/242136
PCT Pub. Date: Dec. 26, 2019

(65) Prior Publication Data
US 2021/0405323 A1  Dec. 30, 2021

(30) Foreign Application Priority Data
Jun. 20, 2018 (CN) .......................... 201810636476.2

(51) Int. Cl.
*G02B 13/00* (2006.01)
*G06V 40/13* (2022.01)
*G02B 5/20* (2006.01)

(52) U.S. Cl.
CPC ........... *G02B 13/0025* (2013.01); *G02B 5/20* (2013.01); *G02B 13/006* (2013.01); *G06V 40/1324* (2022.01)

(58) Field of Classification Search
CPC .... G02B 13/0025; G02B 13/006; G02B 5/20; G06K 9/00046

USPC .......................................................... 359/723
See application file for complete search history.

(56) References Cited

U.S. PATENT DOCUMENTS

| 2009/0116030 A1* | 5/2009 | Bahuguna .......... G06K 9/00046 356/457 |
| 2017/0220840 A1 | 8/2017 | Wickboldt et al. |
| 2018/0095249 A1* | 4/2018 | Hsueh .................... G02B 13/04 |

FOREIGN PATENT DOCUMENTS

| CN | 104537366 A | 4/2015 |
| CN | 104656230 A | 5/2015 |
| CN | 105388592 A | 3/2016 |
| CN | 105824108 A | 8/2016 |

(Continued)

OTHER PUBLICATIONS

International Search Report for Application PCT/CN2018/106602, dated Sep. 26, 2019, 5 pages.

(Continued)

*Primary Examiner* — Marin Pichler
*Assistant Examiner* — Mitchell T Oestreich
(74) *Attorney, Agent, or Firm* — Barnes & Thornburg LLP

(57) ABSTRACT

An optical system, sequentially from an object side to an image side along an optical axis, includes: an glass screen (E1), an interference screen (S3), a lens group, and a color filter (E3). An effective focal length f of the optical system and an entrance pupil diameter EPD of the optical system satisfy f/EPD<1.8. The optical system may be used for fingerprint recognition, and has characteristics such as a large field of view, a larger aperture, and an ultra-thin feature, etc.

18 Claims, 7 Drawing Sheets

(56) References Cited

FOREIGN PATENT DOCUMENTS

| | | |
|---|---|---|
| CN | 106610519 A | 5/2017 |
| CN | 106646822 A | 5/2017 |
| CN | 107195661 A | 9/2017 |
| CN | 107251046 A | 10/2017 |
| CN | 107728288 A | 2/2018 |

OTHER PUBLICATIONS

Chinese Office Action for Application No. 201811344964.2, dated Jul. 15, 2020, 5 pages.

\* cited by examiner

OPTICAL SYSTEM

CROSS-REFERENCE TO RELATED APPLICATION

This application is a U.S. nationalization under 35 U.S.C. § 371 of International Application No. PCT/CN2018/106602, filed 20 Sep. 2018, which claims the priority of Chinese Patent Application No. 201810636476.2, filed 20 Jun. 2018. All of the aforementioned applications are hereby incorporated by reference in their entireties.

TECHNICAL FIELD

The present disclosure relates to an optical system, and specifically, to an optical system for fingerprint recognition.

BACKGROUND

With the continuous development of technology, the screen-to-body ratio of mobile terminals such as mobile phones become higher and higher, and full-screen mobile terminals have become the development trend of mobile terminals. Accordingly, there is a need for fingerprint recognition used with a full screen. Therefore, optical fingerprint recognition with good penetration become a new technical development direction.

The existing optical fingerprint recognition system do not have good penetrability, and generally cannot combine characteristics such as a large field of view, a large aperture, and an ultra-thin feature, and thus cannot provide better fingerprint recognition.

SUMMARY

The present disclosure provides a penetrating optical fingerprint system that at least addresses or partly addresses at least one of the above-discussed shortcomings of the prior art which is applicable to portable electronic products.

In one aspect, the present disclosure provides an optical system that, sequentially from an object side to an image side along an optical axis, may include: an glass screen, an interference screen, a lens group, and a color filter. An effective focal length f of the optical system and an entrance pupil diameter EPD of the optical system may satisfy f/EPD<1.8.

In one implementation, the optical system may satisfy P/H<1.5, where P is an on-axis distance from an object to an object-side surface of a lens among the lens group closest to the object side, and H is an object height perpendicular to the optical axis on the glass screen.

In one implementation, the optical system may satisfy 0.5<ImgH/f<1.5, where ImgH is half of a diagonal length of an effective pixel area on an image plane of the optical system, and f is the effective focal length of the optical system.

In one implementation, the optical system may satisfy CRA≤35°, where CRA is a maximum angle of a chief incident ray on an image plane.

In one implementation, the lens group includes a first lens, and an image-side surface of the first lens may be a convex surface.

In one implementation, the lens group includes a first lens and a second lens. Optionally, the first lens and the second lens may be glued together.

In another aspect, the present disclosure also provides an optical system that, sequentially from an object side to an image side along an optical axis, may include: an glass screen, an interference screen, a lens group, and a color filter. The optical system may satisfy 0.5<ImgH/f<1.5, where ImgH is half of a diagonal length of an effective pixel area on an image plane of the optical system, and f is an effective focal length of the optical system.

In still another aspect, the present disclosure also provides a fingerprint recognition apparatus including the optical system as described above.

The optical system according to the present disclosure realizes at least one of the advantages such as a large field of view, a larger aperture, and an ultra-thin feature, etc., by rationally arranging various optical elements and by using aspheric lenses.

BRIEF DESCRIPTION OF THE DRAWINGS

Other features, purpose and advantages of the present disclosure will become apparent through detailed description of the non-limiting implementations given in conjunction with the accompanying drawings. In the drawings.

DETAILED DESCRIPTION OF EMBODIMENTS

Figure 1:
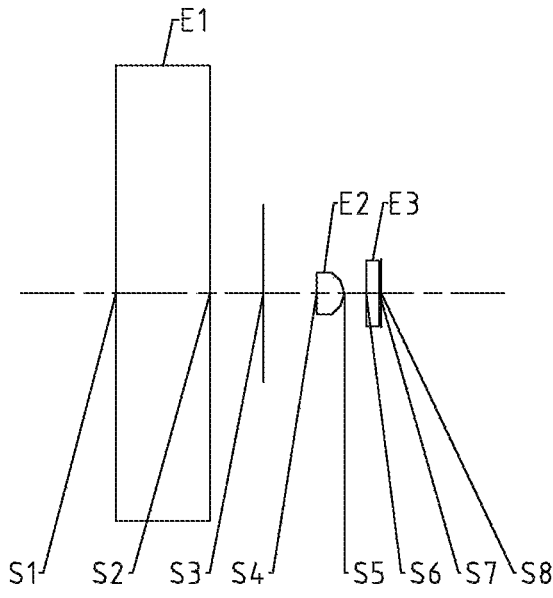
FIG. 1 illustrates a schematic structural view of an optical system according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way to limit the scope of the present disclosure. Throughout the specification, the same reference numerals designate the same elements. The expression "and/or" includes any and all combinations of one or more of the associated listed items.

It should be noted that, in the present specification, the expressions such as first and second are merely used for distinguishing one feature from another feature without indicating any limitation on the features. Thus, a first lens discussed below could be referred to as a second lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely exemplary, but are not strictly drawn to scale.

Herein, a paraxial region refers to a region near the optical axis. If a surface of a lens is a convex surface and the position of the convex surface is not defined, it indicates that the surface of the lens is a convex surface at least in the paraxial region; and if a surface of a lens is a concave surface and the position of the concave surface is not defined, it indicates that the surface of the lens is a concave surface at least in the paraxial region. For each lens, a surface closest to the object side is referred to as an object-side surface; and for each lens, a surface of closest to the image side is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical system according to an exemplary implementation the present disclosure, sequentially from an object side to an image side along an optical axis, includes: an glass screen, an interference screen, a lens group, and a color filter. The glass screen is a protective glass. The interference screen is a circuit grid portion having a light transmission gap in an OLED screen or a LCD screen. The interference screen has a diffraction effect, and the wavelength range thereof is between 400~600 nm.

The lens group may include at least one lens. In some implementations, the lens group may include only one lens (i.e., a first lens), an object-side surface of the lens may be a flat surface and an image-side surface thereof may be a convex surface. In some implementations, the lens group may include two lenses (i.e., a first lens and a second lens), and an air gap may be exist between the two lenses or the two lenses may be glued to form a bonding lens. It will be understand by those skilled in the art that, the arrangement of the lens group is not limited thereto, and the lens group may have two or more lenses if necessary.

In an exemplary implementation, the optical system of the present disclosure may satisfy the conditional expression f/EPD<1.8, where f is an effective focal length of the optical system, and EPD is an entrance pupil diameter of the optical system. More specifically, f and EPD may further satisfy $1.50 \leq f/EPD \leq 1.78$. The use of a large aperture system may effectively enhance the pulse of light waves and improve the penetration effect, thereby minimizing the optical performance degradation caused by a screen of an electronic product.

Figure 25:
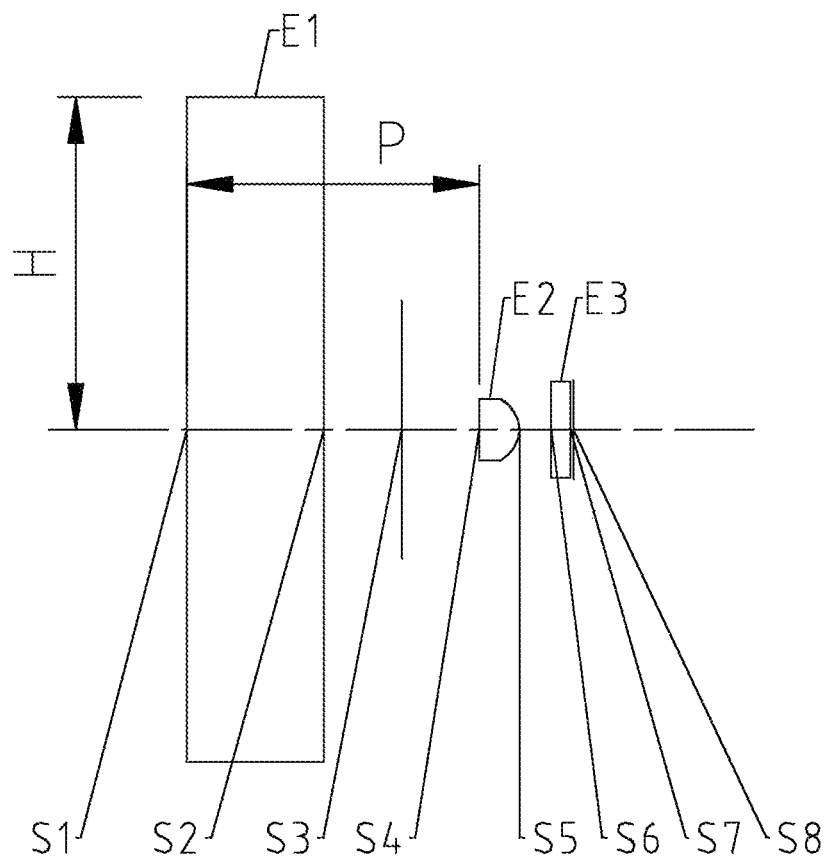
FIG. 25 schematically illustrates an on-axis distance P from an object to an object-side surface of a lens among the lens group closest to the object side and an object height H perpendicular to the optical axis on the glass screen when the object distance is zero.

In an exemplary implementation, the optical system of the present disclosure may satisfy the conditional expression P/H<1.5, where P is an on-axis distance from an object to an object-side surface of a lens among the lens group closest to the object side, and H is an object height perpendicular to the optical axis on the glass screen. More specifically, P and H may further satisfy $0.73 \leq P/H \leq 1.41$. When the object distance is zero, P and H are schematically illustrated by FIG. 25. Satisfying the conditional expression P/H<1.5 is beneficial to ensure that the object height meets the requirements of different sizes of fingerprint surface and to realize the overall miniaturization of the optical lens assembly so that the fingerprint recognition system may be disposed at the lower end of a screen of a portable electronic product.

In an exemplary implementation, the optical system of the present disclosure may satisfy a conditional expression 0.5<ImgH/f<1.5, where ImgH is half of a diagonal length of an effective pixel area on an image plane of the optical system, and f is an effective focal length of the optical system. More specifically, ImgH and f may further satisfy 0.61≤ImgH/f≤1.42. Satisfying the conditional expression 0.5<ImgH/f<1.5 is beneficial to ensure that the field of view for recognition of the entire lens assembly substantially, in the case of different object distances, includes the fingerprint sizes of all people. When the ratio of ImgH and f is out of the limited range of the conditional expression 0.5<ImgH/f<1.5, the total length of the lens assembly is difficult to meet the specifications, or the brightness of the image surface is difficult to meet the requirement for recognition.

In an exemplary implementation, the optical system of the present disclosure may satisfy a conditional expression CRA≤35°, where CRA is a maximum angle of a chief incident ray on an image plane of the optical system. More specifically, CRA may further satisfy 12.6°≤CRA≤34.8°. CRA is controlled to achieve chip matching. Meanwhile, satisfying the conditional expression CRA≤35° is beneficial to increase the cone angle of the light ray to obtain a bright image surface. When CRA is out of the limited range of CRA≤35°, there may be a significant abnormality in chip matching and in the brightness of the image surface.

In an exemplary implementation, the optical system described above may further include a diaphragm to improve the imaging quality of the lens assembly.

In the implementations of the present disclosure, most of the lenses having aspheric surface. The aspheric lens is characterized by a continuous change in curvature from the center of the lens to the periphery thereof. Unlike a spherical lens having a constant curvature from the center of the lens to the periphery thereof, the aspheric lens has a better curvature radius characteristics, and has the advantages of improving distortion aberration and improving astigmatic aberration. By using aspheric lens(es), the aberrations that occur during imaging may be eliminated as much as possible, thereby improving image quality.

By rationally arranging various optical elements, the optical system of the present disclosure has characteristics such as a large field of view, a large aperture, and an ultra-thin feature. The optical system configured as described above may be used for fingerprint recognition and may be applied to a portable electronic product such as a mobile phone.

However, it should be understood by those skilled in the art that, without departing from the technical solution sought to be protected by the present disclosure, the number of lenses forming the optical system may be changed, to obtain various results and advantages described herein.

Specific embodiments applicable to the optical system of the above implementations will be further described below with reference to the accompanying drawings.

Embodiment 1

An optical system according to embodiment 1 of the present disclosure is described below with reference to FIG. 1 and FIG. 2. FIG. 1 illustrates a schematic structural view of the optical system according to embodiment 1 of the present disclosure.

As shown in FIG. 1, the optical system according to an example implementation of the present disclosure, sequentially from an object side to an image side along an optical axis, includes: an glass screen E1, an interference screen S3, a lens group, and a color filter E3.

The glass screen E1 has an object-side surface S1 and an image-side surface S2. The lens group includes a first lens E2. An object-side surface S4 of the first lens E2 is a flat surface, and an image-side surface S5 of the first lens E2 is a convex surface. The color filter E3 has an object-side surface S6 and an image-side surface S7. Light from the object sequentially passes through the respective surfaces S1 to S7 and is finally imaged on an image plane S8.

The optical system of the present embodiment may further include a diaphragm STO for limiting the light beam to improve the imaging quality of the optical system.

Table 1 shows surface type, radius of curvature, thickness, material and conic coefficient of each optical element of the optical system in embodiment 1, wherein the units for the radius of curvature and the thickness are millimeter (mm).

TABLE 1

| Surface number | Surface type | Radius of curvature | Thickness | Refractive index | Abbe number | Conic coefficient |
|---|---|---|---|---|---|---|
| OBJ | spherical | infinite | 0.0000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8550 | | | 0.0000 |
| S4(STO) | spherical | infinite | 0.4421 | 1.64 | 23.2 | 0.0000 |
| S5 | aspheric | −0.2800 | 0.3463 | | | −0.7998 |
| S6 | spherical | infinite | 0.2100 | 1.52 | 64.2 | 0.0000 |
| S7 | spherical | infinite | 0.0317 | | | |
| S8 | spherical | infinite | | | | |

According to table 1, the image-side surface S5 of the first lens E2 is aspheric. In the present embodiment, the surface shape x of an aspheric lens can be defined by, but not limited to, the following aspheric formula:

$$x = \frac{ch^2}{1+\sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is the paraxial curvature of the aspheric surface, c=1/R (that is, the paraxial curvature c is a reciprocal of the curvature radius in the above Table 1); k is the conic coefficient (given in the above Table 1); Ai is a correction coefficient for the i-th order of the aspheric surface. Table 2 below shows high-order coefficients $A_4$, $A_6$, $A_8$, $A_{10}$, $A_{12}$, and $A_{14}$ applicable to the aspheric surface S5 in embodiment 1.

TABLE 2

| Surface number | A4 | A6 | A8 | A10 | A12 | A14 |
|---|---|---|---|---|---|---|
| S5 | −2.3824E−01 | 1.4353E−02 | 6.8430E−04 | 6.4109E−05 | −6.6553E−05 | 5.06893E−06 |

In the present embodiment, f and EPD satisfy f/EPD=1.70, where f is an effective focal length of the optical system, and EPD is an entrance pupil diameter of the optical system; P and H satisfy P/H=0.89, where P is an on-axis distance from the object to the object-side surface S4 of the first lens E2, and H is an object height perpendicular to the optical axis on the glass screen; ImgH and f satisfy ImgH/f=1.17, where ImgH is half of a diagonal length of an effective pixel area on the image plane S8, and f is the effective focal length of the optical system; and CRA satisfies CRA=26.2°, where CRA is a maximum angle of a chief incident ray on the image plane.

Figure 2:
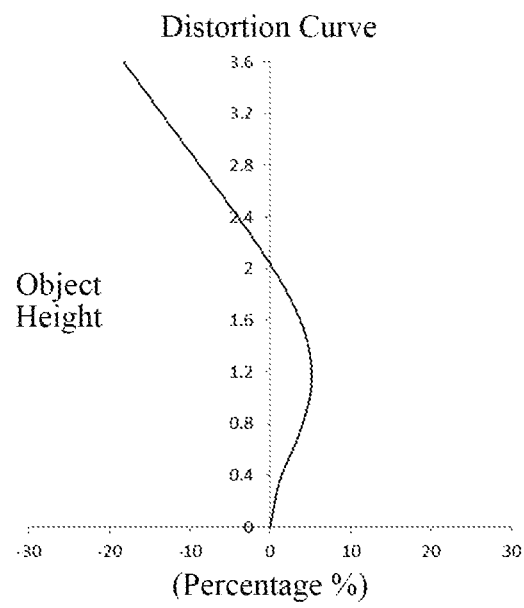
FIG. 2 illustrates a distortion curve of the optical system according to embodiment 1.

FIG. 2 illustrates a distortion curve of the optical system according to embodiment 1, representing amounts of distortion at different object heights. As can be seen from FIG. 2, the optical system in embodiment 1 can achieve good image quality.

Embodiment 2

Figure 3:
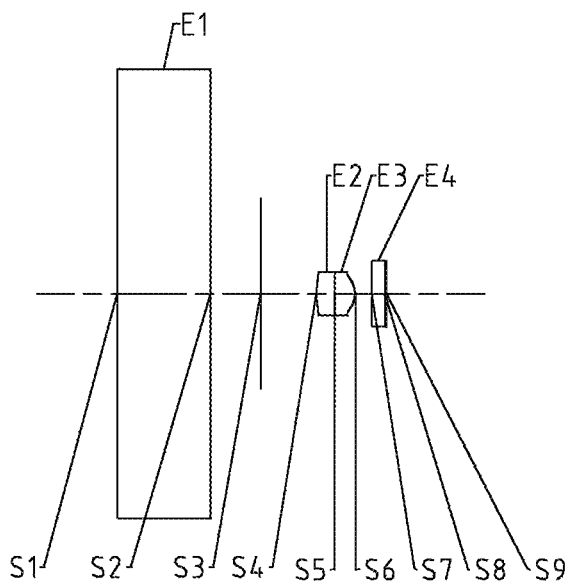
FIG. 3 illustrates a schematic structural view of an optical system according to embodiment 2 of the present disclosure.

An optical system according to embodiment 2 of the present disclosure is described below with reference to FIG. 3 and FIG. 4. In the present embodiment and the following embodiments, descriptions similar to embodiment 1 will be omitted for brevity. FIG. 3 illustrates a schematic structural view of the optical system according to embodiment 2 of the present disclosure.

As shown in FIG. 3, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a flat surface. An object-side surface S5 of the second lens E3 is a flat surface, and an image-side surface S6 of the second lens E3 is a convex surface. The first lens E2 and the second lens E3 may be glued to form a bonding lens. The color filter E4 has an object-side surface S7 and an image-side surface S8. Light from the object sequentially passes through the respective surfaces S1 to S8 and is finally imaged on an image plane S9.

The optical system of the present embodiment may further include a diaphragm STO for limiting the light beam to improve the imaging quality of the optical system.

Table 3 shows surface type, radius of curvature, thickness, material and conic coefficient of each optical element of the optical system in embodiment 2, wherein the units for the radius of curvature and the thickness are millimeter (mm).

TABLE 3

| Surface number | Surface type | Radius of curvature | Thickness | Refractive index | Abbe number | Conic coefficient |
|---|---|---|---|---|---|---|
| OBJ | spherical | infinite | 0.0000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8500 | | | 0.0000 |
| S4 | aspheric | 0.9342 | 0.3000 | 1.55 | 56.1 | 0.0000 |
| S5(STO) | spherical | infinite | 0.3328 | 1.64 | 23.2 | 0.0000 |
| S6 | aspheric | −0.2800 | 0.2614 | | | −1.5586 |
| S7 | spherical | infinite | 0.2100 | 1.52 | 64.2 | 0.0000 |
| S8 | spherical | infinite | 0.0247 | | | 0.0000 |
| S9 | spherical | infinite | | | | |

According to table 3, in embodiment 2, the object-side surface S4 of the first lens E2 and the image-side surface S6 of the second lens E3 are aspheric. Table 4 below shows high-order coefficients applicable to each aspheric surface in embodiment 2, wherein, the surface shape of each aspheric lens can be defined by the formula (1) shown in embodiment 1.

TABLE 4

| Surface number | A4 | A6 | A8 | A10 | A12 | A14 | A16 |
|---|---|---|---|---|---|---|---|
| S4 | −8.3557E+00 | 1.4555E+02 | −1.3011E+03 | 4.3304E+03 | 5.7856E−14 | 9.7184E−16 | 9.4427E−17 |
| S6 | 1.2834E+01 | −5.8548E+02 | 7.7479E+03 | 9.7000E+03 | −4.7161E+05 | −10193638.46 | 1.1703E+08 |

In the present embodiment, f and EPD satisfy f/EPD=1.75, where f is an effective focal length of the optical system, and EPD is an entrance pupil diameter of the optical system; P and H satisfy P/H=0.89, where P is an on-axis distance from the object to the object-side surface S4 of the first lens E2, and H is an object height perpendicular to the optical axis on the glass screen; ImgH and f satisfy ImgH/f=1.14, where ImgH is half of a diagonal length of an effective pixel area of the image plane S9, f is the effective focal length of the optical system; and CRA satisfies CRA=34.8°, where CRA is a maximum angle of a chief incident ray on the image plane.

Figure 4:
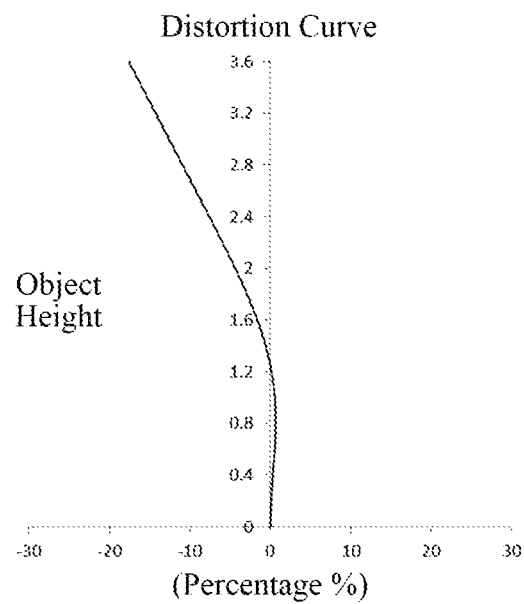
FIG. 4 illustrates a distortion curve of the optical system according to embodiment 2.

FIG. 4 illustrates a distortion curve of the optical system according to embodiment 2, representing amounts of distortion at different object heights. As can be seen from FIG. 4, the optical system in embodiment 2 can achieve good image quality.

Embodiment 3

Figure 5:
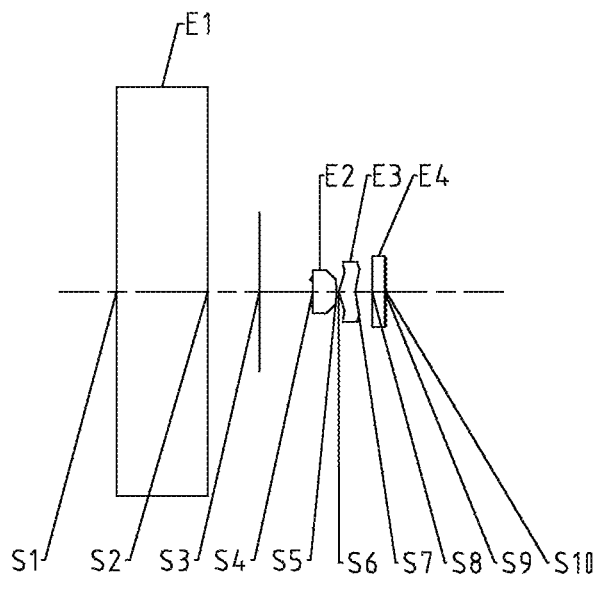
FIG. 5 illustrates a schematic structural view of an optical system according to embodiment 3 of the present disclosure.

An optical system according to embodiment 3 of the present disclosure is described below with reference to FIG. 5 and FIG. 6. FIG. 5 illustrates a schematic structural view of the optical system according to embodiment 3 of the present disclosure.

As shown in FIG. 5, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a concave surface. An object-side surface S6 of the second lens E3 is a convex surface, and an image-side surface S7 of the second lens E3 is a concave surface. The color filter E4 has an object-side surface S8 and an image-side surface S9. Light from the object sequentially passes through the respective surfaces S1 to S9 and is finally imaged on an image plane S10.

The optical system of the present embodiment may further include a diaphragm STO for limiting the light beam to improve the imaging quality of the optical system.

Table 5 shows surface type, radius of curvature, thickness, material and conic coefficient of each optical element of the optical system in embodiment 3, wherein the units for the radius of curvature and the thickness are millimeter (mm).

TABLE 5

| Surface number | Surface type | Radius of curvature | Thickness | Material Refractive index | Abbe number | Conic coefficient |
|---|---|---|---|---|---|---|
| OBJ | spherical | infinite | 0.2000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8500 | | | 0.0000 |
| STO | spherical | infinite | 0.0285 | | | 0.0000 |
| S4 | aspheric | 2.8217 | 0.3932 | 1.55 | 56.1 | −6.0466 |
| S5 | aspheric | 2.4037 | 0.0300 | | | −17.3492 |
| S6 | aspheric | 0.2887 | 0.2760 | 1.64 | 23.8 | −0.8927 |
| S7 | aspheric | 21.3050 | 0.2747 | | | 3.0000 |
| S8 | spherical | infinite | 0.2100 | 1.52 | 64.2 | 0.0000 |
| S9 | spherical | infinite | 0.0200 | | | 0.0000 |
| S10 | spherical | infinite | | | | |

According to table 5, in embodiment 3, the object-side surface S4 and the image-side surface S5 of the first lens E2 as well as the object-side surface S6 and the image-side surface S7 of the second lens E3 are aspheric. Table 6 below shows high-order coefficients applicable to each aspheric surface in embodiment 3, wherein, the surface shape of each aspheric lens can be defined by the formula (1) shown in embodiment 1.

TABLE 6

| Surface number | A4 | A6 | A8 | A10 | A12 |
|---|---|---|---|---|---|
| S4 | −6.7373E−03 | −4.4933E−04 | 6.9611E−04 | −1.2837E−04 | 6.4458E−06 |
| S5 | −1.9122E−01 | 5.2839E−03 | 3.3127E−03 | −1.5217E−03 | 1.9422E−03 |
| S6 | −2.9115E−01 | 3.7934E−03 | 1.3858E−02 | 1.5980E−04 | −3.7185E−04 |
| S7 | 7.1192E−02 | −7.6954E−02 | 3.4319E−02 | −9.1049E−03 | 4.3977E−03 |

| Surface number | A14 | A16 | A18 | A20 |
|---|---|---|---|---|
| S4 | −9.8549E−06 | 1.7034E−04 | 9.8793E−05 | 8.0660E−05 |
| S5 | −6.0475E−04 | 5.4956E−04 | −3.3735E−04 | 1.1353E−04 |
| S6 | −1.5368E−03 | 5.9566E−04 | −1.6481E−04 | 2.3786E−04 |
| S7 | −1.3453E−03 | 4.5202E−04 | −3.8893E−04 | 2.1384E−04 |

In the present embodiment, f and EPD satisfy f/EPD=1.68, where f is an effective focal length of the optical system, and EPD is an entrance pupil diameter of the optical system; P and H satisfy P/H=0.95, where P is an on-axis distance from the object to the object-side surface S4 of the first lens E2, and H is an object height perpendicular to the optical axis on the glass screen; ImgH and f satisfy ImgH/f=0.76, where ImgH is half of a diagonal length of an effective pixel area on the image plane S10, and f is the effective focal length of the optical system; and CRA satisfies CRA=12.6°, where CRA is a maximum angle of a chief incident ray on the image plane.

Figure 6:
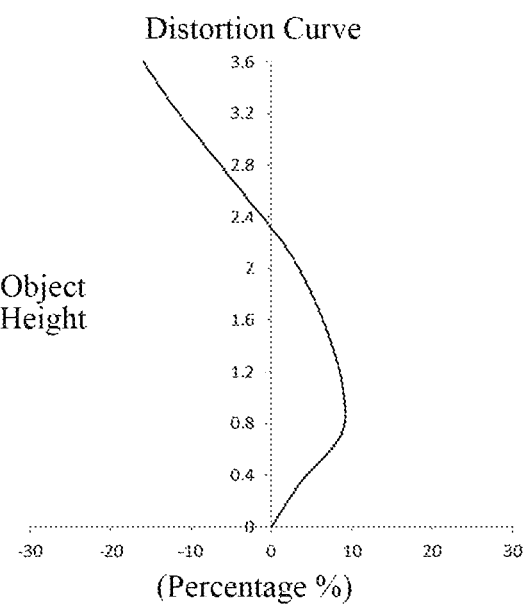
FIG. 6 illustrates a distortion curve of the optical system according to embodiment 3.

FIG. 6 illustrates a distortion curve of the optical system according to embodiment 3, representing amounts of distortion at different object heights. As can be seen from FIG. 6, the optical system in embodiment 3 can achieve good image quality.

Embodiment 4

Figure 7:
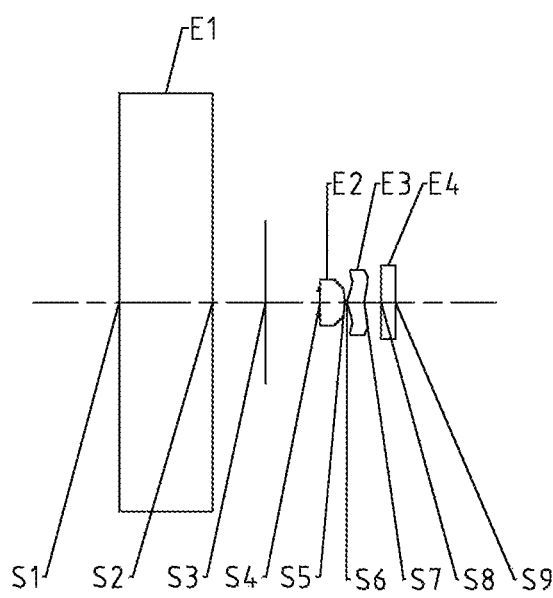
FIG. 7 illustrates a schematic structural view of an optical system according to embodiment 4 of the present disclosure.

An optical system according to embodiment 4 of the present disclosure is described below with reference to FIG. 7 and FIG. 8. FIG. 7 illustrates a schematic structural view of the optical system according to embodiment 4 of the present disclosure.

As shown in FIG. 7, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a concave surface. An object-side surface S6 of the second lens E3 is a convex surface, and an image-side surface S7 of the second lens E3 is a concave surface. The color filter E4 has an object-side surface S8 and an image-side surface S9. Light from the object sequentially passes through the respective surfaces S1 to S9 and is finally imaged on an image plane S10 (the image plane S10 coincides with the image-side surface S9 of the color filter E4).

The optical system of the present embodiment may further include a diaphragm STO for limiting the light beam to improve the imaging quality of the optical system.

Table 7 shows surface type, radius of curvature, thickness, material and conic coefficient of each optical element of the optical system in embodiment 4, wherein the units for the radius of curvature and the thickness are millimeter (mm).

TABLE 7

| Surface number | Surface type | Radius of curvature | Thickness | Refractive index | Abbe number | Conic coefficient |
|---|---|---|---|---|---|---|
| OBJ | spherical | infinite | 0.2000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8500 | | | 0.0000 |
| STO | spherical | infinite | 0.0279 | | | 0.0000 |
| S4 | aspheric | 2.5798 | 0.3958 | 1.55 | 56.1 | 2.9993 |
| S5 | aspheric | 2.0280 | 0.0300 | | | −19.5313 |
| S6 | aspheric | 0.2868 | 0.2799 | 1.64 | 23.5 | −0.8916 |
| S7 | aspheric | 13.7874 | 0.2737 | | | 2.1499 |
| S8 | spherical | infinite | 0.2300 | 1.52 | 64.2 | 0.0000 |
| S9 | spherical | infinite | 0.0000 | | | 0.0000 |
| S10 | spherical | infinite | | | | |

According to table 7, in embodiment 4, the object-side surface S4 and the image-side surface S5 of the first lens E2 as well as the object-side surface S6 and the image-side surface S7 of the second lens E3 are aspheric. Table 8 below shows high-order coefficients applicable to each aspheric surface in embodiment 4, wherein, the surface shape of each aspheric lens can be defined by the formula (1) shown in embodiment 1.

TABLE 8

| Surface number | A4 | A6 | A8 | A10 | A12 |
|---|---|---|---|---|---|
| S4 | −1.0882E−02 | 2.5188E−03 | 4.6600E−04 | −1.2440E−03 | 9.4092E−05 |
| S5 | −1.9797E−01 | 7.1557E−03 | 2.5761E−03 | −1.0973E−03 | 1.7482E−03 |
| S6 | −2.9408E−01 | 4.5621E−03 | 1.0731E−02 | 7.6394E−04 | −7.2872E−04 |
| S7 | 5.9908E−02 | −7.7354E−02 | 3.4992E−02 | −1.0307E−02 | 3.7115E−03 |

| Surface number | A14 | A16 | A18 | A20 |
|---|---|---|---|---|
| S4 | 3.1270E−04 | 1.8145E−04 | 1.8494E−06 | 9.2421E−05 |
| S5 | −5.6763E−04 | 4.8592E−04 | −3.3448E−04 | 1.2931E−04 |
| S6 | −1.5714E−03 | 3.3920E−04 | −1.7493E−04 | 1.5631E−04 |
| S7 | −2.2211E−03 | 1.6649E−04 | −4.1400E−04 | 3.4785E−04 |

In the present embodiment, f and EPD satisfy f/EPD=1.68, where f is an effective focal length of the optical system, and EPD is an entrance pupil diameter of the optical system; P and H satisfy P/H=0.95, where P is an on-axis distance from the object to the object-side surface S4 of the first lens E2, and H is an object height perpendicular to the optical axis on the glass screen; ImgH and f satisfy ImgH/f=1.15, where ImgH is half of a diagonal length of an effective pixel area on the image plane S9, and f is the effective focal length of the optical system; and CRA satisfies CRA=19.8°, where CRA is a maximum angle of a chief incident ray on the image plane.

Figure 8:
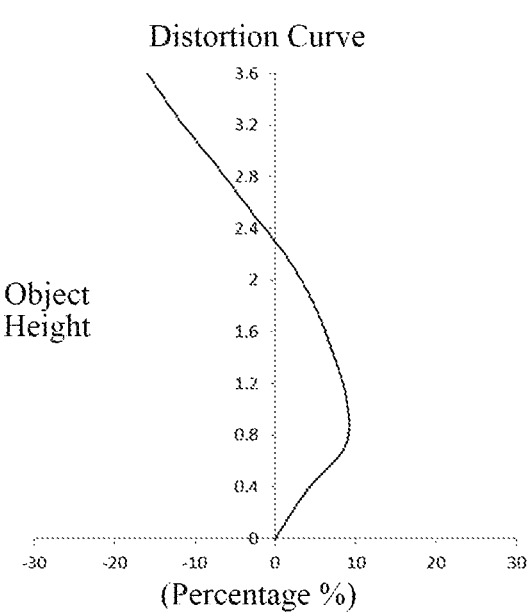
FIG. 8 illustrates a distortion curve of the optical system according to embodiment 4.

FIG. 8 illustrates a distortion curve of the optical system according to embodiment 4, representing amounts of distortion at different object heights. As can be seen from FIG. 8, the optical system in embodiment 4 can achieve good image quality.

Embodiment 5

Figure 9:
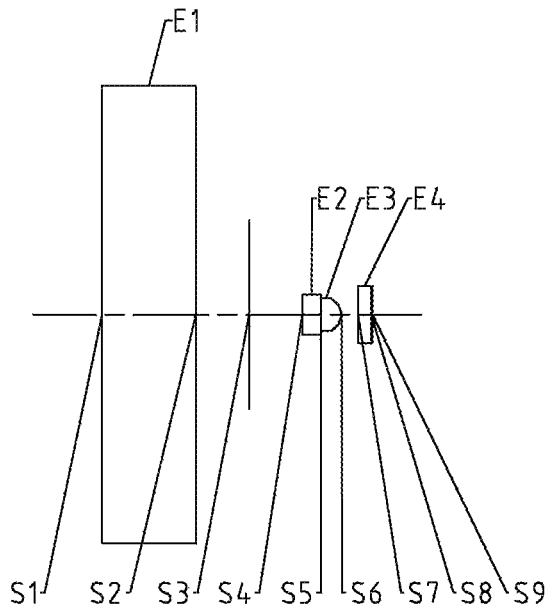
FIG. 9 illustrates a schematic structural view of an optical system according to embodiment 5 of the present disclosure.

An optical system according to embodiment 5 of the present disclosure is described below with reference to FIG. 9 and FIG. 10. FIG. 9 illustrates a schematic structural view of the optical system according to embodiment 5 of the present disclosure.

As shown in FIG. 9, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a flat surface, and an image-side surface S5 of the first lens E2 is a flat surface. An object-side surface S5 of the second lens E3 is a flat surface, and an image-side surface S6 of the second lens E3 is a convex surface. The first lens E2 and the second lens E3 may be glued to form a bonding lens. The color filter E4 has an object-side surface S7 and an image-side surface S8. Light from the object sequentially passes through the respective surfaces S1 to S8 and is finally imaged on an image plane S9.

The optical system of the present embodiment may further include a diaphragm STO for limiting the light beam to improve the imaging quality of the optical system.

Table 9 shows surface type, radius of curvature, thickness, material and conic coefficient of each optical element of the optical system in embodiment 5, wherein the units for the radius of curvature and the thickness are millimeter (mm).

TABLE 9

| Surface number | Surface type | Radius of curvature | Thickness | Material Refractive index | Material Abbe number | Conic coefficient |
|---|---|---|---|---|---|---|
| OBJ | spherical | infinite | 0.2000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8500 | | | 0.0000 |
| S4 | spherical | infinite | 0.3000 | 1.55 | 56.1 | 0.0000 |
| S5(STO) | spherical | infinite | 0.3298 | 1.55 | 56.1 | 0.0000 |
| S6 | aspheric | −0.2518 | 0.2614 | | | −0.4131 |
| S7 | spherical | infinite | 0.2100 | 1.52 | 64.2 | 0.0000 |
| S8 | spherical | infinite | 0.0200 | | | 0.0000 |
| S9 | spherical | infinite | | | | |

According to table 9, in embodiment 5, and the image-side surface S6 of the second lens E3 is aspheric. Table 10 below shows high-order coefficients applicable to each aspheric surface in embodiment 5, wherein, the surface shape of each aspheric lens can be defined by the formula (1) shown in embodiment 1.

TABLE 10

| Surface number | A4 | A6 | A8 | A10 | A12 | A14 | A16 |
|---|---|---|---|---|---|---|---|
| S6 | 0 | 0 | 0 | 0 | 0 | 0 | 0 |

In the present embodiment, f and EPD satisfy f/EPD=1.75, where f is an effective focal length of the optical system, and EPD is an entrance pupil diameter of the optical system; P and H satisfy P/H=0.88, where P is an on-axis distance from the object to the object-side surface S4 of the first lens E2, and H is an object height perpendicular to the optical axis on the glass screen; ImgH and f satisfy ImgH/f=0.61, where ImgH is half of a diagonal length of an effective pixel area on the image plane S9, and f is the effective focal length of the optical system; and CRA satisfies CRA=18.5°, where CRA is a maximum angle of a chief incident ray on the image plane.

Figure 10:
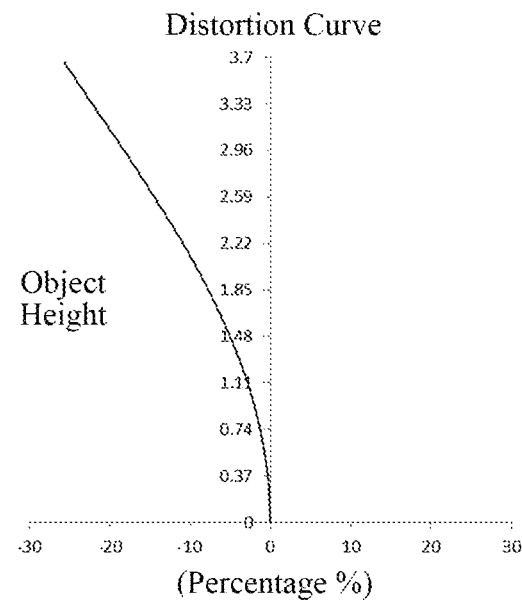
FIG. 10 illustrates a distortion curve of the optical system according to embodiment 5.

FIG. 10 illustrates a distortion curve of the optical system according to embodiment 5, representing amounts of distortion at different object heights. As can be seen from FIG. 10, the optical system in embodiment 5 can achieve good image quality.

Embodiment 6

Figure 11:
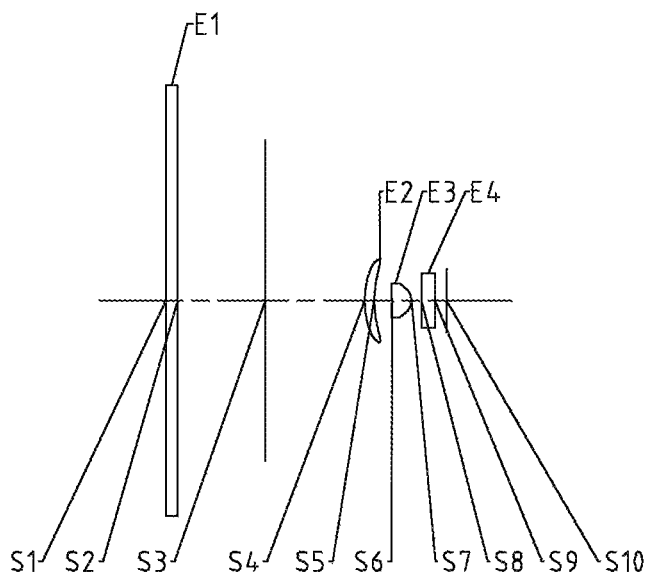
FIG. 11 illustrates a schematic structural view of an optical system according to embodiment 6 of the present disclosure.

An optical system according to embodiment 6 of the present disclosure is described below with reference to FIG. 11 and FIG. 12. FIG. 11 illustrates a schematic structural view of the optical system according to embodiment 6 of the present disclosure.

As shown in FIG. 11, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a concave surface. An object-side surface S6 of the second lens E3 is a concave surface, and an image-side surface S7 of the second lens E3 is a convex surface. The color filter E4 has an object-side surface S8 and an image-side surface S9. Light from the object sequentially passes through the respective surfaces S1 to S9 and is finally imaged on an image plane S10.

The optical system of the present embodiment may further include a diaphragm STO for limiting the light beam to improve the imaging quality of the optical system.

Table 11 shows surface type, radius of curvature, thickness, material and conic coefficient of each optical element of the optical system in embodiment 6, wherein the units for the radius of curvature and the thickness are millimeter (mm).

TABLE 11

| Surface number | Surface type | Radius of curvature | Thickness | Material Refractive index | Abbe number | Conic coefficient |
|---|---|---|---|---|---|---|
| OBJ | spherical | infinite | 0.0000 | | | |
| S1 | spherical | infinite | 0.2000 | 1.52 | 64.2 | 0.0000 |
| S2 | spherical | infinite | 1.5000 | | | 0.0000 |
| S3 | spherical | infinite | 1.7000 | | | 0.0000 |
| S4 | aspheric | 1.7909 | 0.1570 | 1.55 | 56.1 | 2.7850 |
| S5 | aspheric | 1.3190 | 0.2976 | | | 1.0036 |
| STO | spherical | infinite | 0.0103 | | | 0.0000 |
| S6 | aspheric | −2.3079 | 0.3366 | 1.64 | 23.5 | −20.0000 |
| S7 | aspheric | −0.2527 | 0.1686 | | | −3.0770 |
| S8 | spherical | infinite | 0.2300 | 1.52 | 64.2 | 0.0000 |
| S9 | spherical | infinite | 0.2000 | | | 0.0000 |
| S10 | spherical | infinite | | | | |

According to table 11, in embodiment 6, the object-side surface S4 and the image-side surface S5 of the first lens E2 as well as the object-side surface S6 and the image-side surface S7 of the second lens E3 are aspheric. Table 12 below shows high-order coefficients applicable to each aspheric surface in embodiment 6, wherein, the surface shape of each aspheric lens can be defined by the formula (1) shown in embodiment 1.

TABLE 12

| Surface number | A4 | A6 | A8 | A10 |
|---|---|---|---|---|
| S4 | −2.7940E−01 | 3.7477E+00 | −1.2756E+01 | 1.4779E+01 |
| S5 | −8.2011E−01 | 4.2270E−02 | 3.5264E+00 | −3.7150E+00 |
| S6 | −1.7708E+01 | 4.1320E+02 | 0.0000E+00 | 0.0000E+00 |
| S7 | −1.2112E+01 | −3.5098E+00 | 0.0000E+00 | 0.0000E+00 |

In the present embodiment, f and EPD satisfy f/EPD=1.78, where f is an effective focal length of the optical system, and EPD is an entrance pupil diameter of the optical system; P and H satisfy P/H=0.93, where P is an on-axis distance from the object to the object-side surface S4 of the first lens E2, and H is an object height perpendicular to the optical axis on the glass screen; ImgH and f satisfy ImgH/f=1.17, where ImgH is half of a diagonal length of an effective pixel area on the image plane S10, and f is the effective focal length of the optical system; and CRA satisfies CRA=27.5°, where CRA is a maximum angle of a chief incident ray on the image plane.

Figure 12:
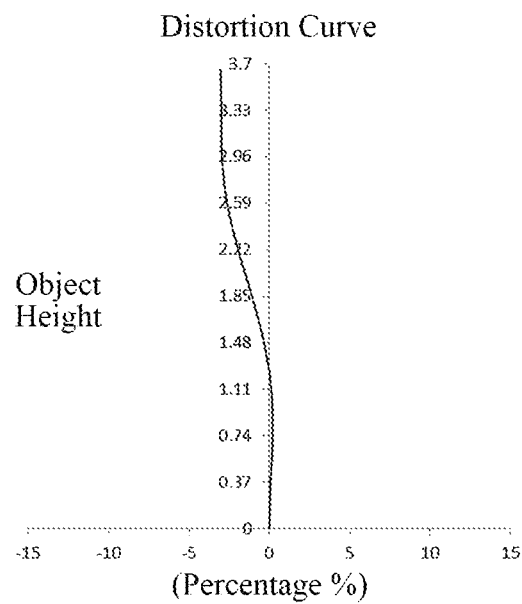
FIG. 12 illustrates a distortion curve of the optical system according to embodiment 6.

FIG. 12 illustrates a distortion curve of the optical system according to embodiment 6, representing amounts of distortion at different object heights. As can be seen from FIG. 12, the optical system in embodiment 6 can achieve good image quality.

Embodiment 7

Figure 13:
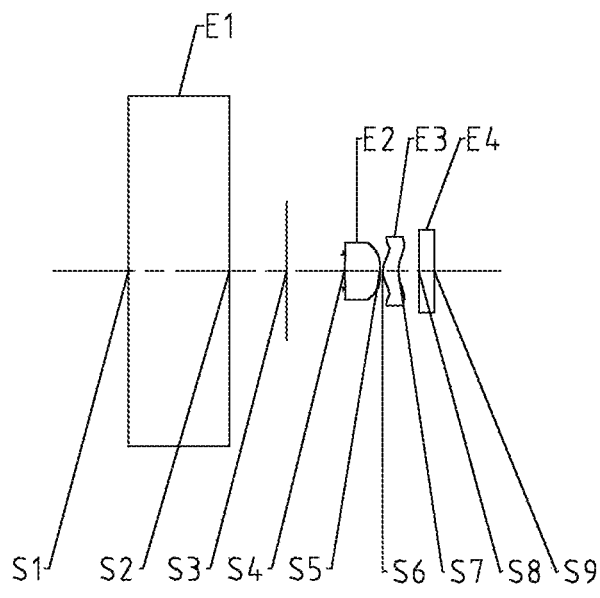
FIG. 13 illustrates a schematic structural view of an optical system according to embodiment 7 of the present disclosure.

An optical system according to embodiment 7 of the present disclosure is described below with reference to FIG. 13 and FIG. 14. FIG. 13 illustrates a schematic structural view of the optical system according to embodiment 7 of the present disclosure.

As shown in FIG. 13, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a concave surface. An object-side surface S6 of the second lens E3 is a convex surface, and an image-side surface S7 of the second lens E3 is a concave surface. The color filter E4 has an object-side surface S8 and an image-side surface S9. Light from the object sequentially passes through the respective surfaces S1 to S9 and is finally imaged on an image plane S10 (the image plane S10 coincides with the image-side surface S9 of the color filter E4).

The optical system of the present embodiment may further include a diaphragm STO for limiting the light beam to improve the imaging quality of the optical system.

Table 13 shows surface type, radius of curvature, thickness, material and conic coefficient of each optical element of the optical system in embodiment 7, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | 1.3570 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8399 | | | 0.0000 |
| STO | spherical | infinite | 0.0148 | | | 0.0000 |
| S4 | aspheric | 1.1129 | 0.5265 | 1.55 | 56.1 | −20.0000 |
| S5 | aspheric | 1.7804 | 0.0409 | | | 3.0000 |
| S6 | aspheric | 0.2938 | 0.2352 | 1.64 | 23.5 | −0.9463 |
| S7 | aspheric | 1.0153 | 0.3024 | | | −20.0000 |
| S8 | spherical | infinite | 0.2300 | 1.52 | 64.2 | 0.0000 |
| S9 | spherical | infinite | 0.0000 | | | 0.0000 |
| S10 | spherical | infinite | | | | |

According to table 13, in embodiment 7, the object-side surface S4 and the image-side surface S5 of the first lens E2 as well as the object-side surface S6 and the image-side surface S7 of the second lens E3 are aspheric. Table 14 below shows high-order coefficients applicable to each aspheric surface in embodiment 7, wherein, the surface shape of each aspheric lens can be defined by the formula (1) shown in embodiment 1.

TABLE 14

| Surface number | A4 | A6 | A8 | A10 | A12 |
|---|---|---|---|---|---|
| S4 | −1.8773E−02 | −1.3736E−03 | −4.5216E−04 | −1.4784E−03 | −7.3659E−04 |
| S5 | −1.7862E−01 | 1.1978E−02 | −6.3159E−05 | −1.7445E−03 | 1.2472E−03 |

TABLE 14-continued

| S6 | −3.0198E−01 | −8.5128E−03 | 8.4350E−03 | 2.8482E−03 | 1.4990E−03 |
|---|---|---|---|---|---|
| S7 | 2.9910E−02 | −6.5543E−02 | 2.7752E−02 | −7.8373E−03 | 3.9505E−03 |

| Surface number | A14 | A16 | A18 | A20 |
|---|---|---|---|---|
| S4 | 1.0555E−04 | −1.9378E−04 | −4.7476E−04 | −3.1131E−04 |
| S5 | −7.2689E−04 | 5.1669E−04 | −3.0700E−04 | 6.9703E−05 |
| S6 | −1.2838E−03 | −7.0549E−04 | −1.0048E−03 | −1.9995E−04 |
| S7 | −6.3809E−04 | 3.4460E−04 | −1.6457E−04 | 1.8411E−04 |

In the present embodiment, f and EPD satisfy f/EPD=1.50, where f is an effective focal length of the optical system, and EPD is an entrance pupil diameter of the optical system; P and H satisfy P/H=1.18, where P is an on-axis distance from the object to the object-side surface S4 of the first lens E2, and H is an object height perpendicular to the optical axis on the glass screen; ImgH and f satisfy ImgH/f=1.00, where ImgH is half of a diagonal length of an effective pixel area on the image plane S9, and f is the effective focal length of the optical system; and CRA satisfies CRA=24.9°, where CRA is a maximum angle of a chief incident ray on the image plane.

Figure 14:
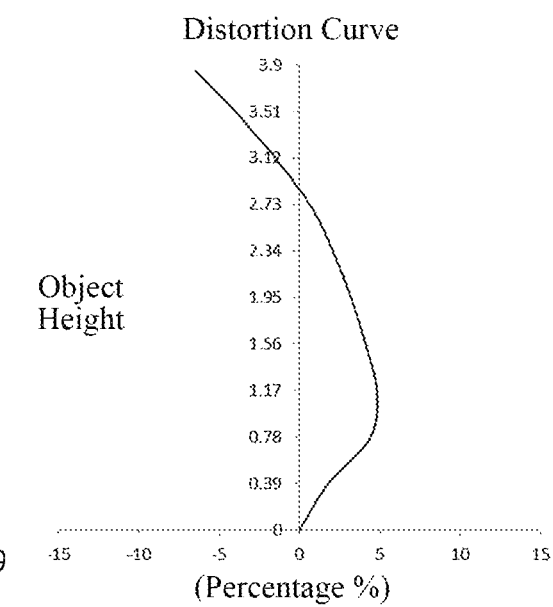
FIG. 14 illustrates a distortion curve of the optical system according to embodiment 7.

FIG. 14 illustrates a distortion curve of the optical system according to embodiment 7, representing amounts of distortion at different object heights. As can be seen from FIG. 14, the optical system in embodiment 7 can achieve good image quality.

Embodiment 8

Figure 15:
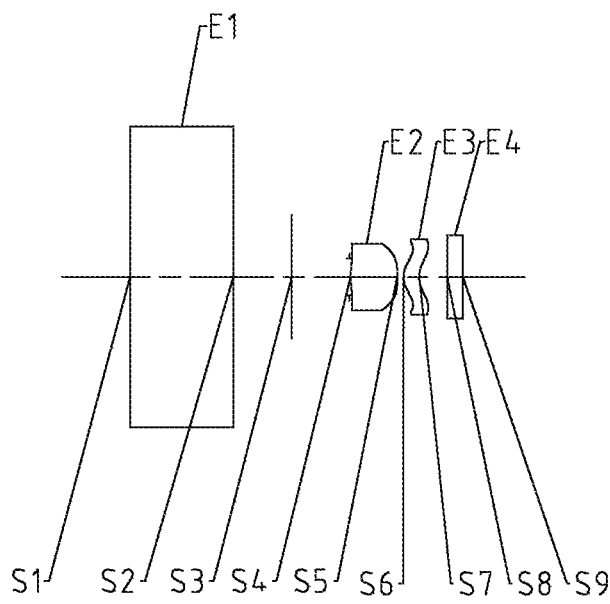
FIG. 15 illustrates a schematic structural view of an optical system according to embodiment 8 of the present disclosure.

An optical system according to embodiment 8 of the present disclosure is described below with reference to FIG. 15 and FIG. 16. FIG. 15 illustrates a schematic structural view of the optical system according to embodiment 8 of the present disclosure.

As shown in FIG. 15, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a convex surface. An object-side surface S6 of the second lens E3 is a convex surface, and an image-side surface S7 of the second lens E3 is a concave surface. The color filter E4 has an object-side surface S8 and an image-side surface S9. Light from the object sequentially passes through the respective surfaces S1 to S9 and is finally imaged on an image plane S10 (the image plane S10 coincides with the image-side surface S9 of the color filter E4).

The optical system of the present embodiment may further include a diaphragm STO for limiting the light beam to improve the imaging quality of the optical system.

Table 15 shows surface type, radius of curvature, thickness, material and conic coefficient of each optical element of the optical system in embodiment 8, wherein the units for the radius of curvature and the thickness are millimeter (mm).

TABLE 15

| Surface number | Surface type | Radius of curvature | Thickness | Material Refractive index | Abbe number | Conic coefficient |
|---|---|---|---|---|---|---|
| OBJ | spherical | infinite | 2.4205 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8399 | | | 0.0000 |
| STO | spherical | infinite | 0.0181 | | | 0.0000 |
| S4 | aspheric | 1.4747 | 0.6745 | 1.55 | 56.1 | −16.7240 |
| S5 | aspheric | −20.8281 | 0.0921 | | | 3.0000 |
| S6 | aspheric | 0.3206 | 0.2300 | 1.64 | 23.5 | −0.8971 |
| S7 | aspheric | 0.5110 | 0.4036 | | | −8.1515 |
| S8 | spherical | infinite | 0.2300 | 1.52 | 64.2 | 0.0000 |
| S9 | spherical | infinite | 0.0000 | | | 0.0000 |
| S10 | spherical | infinite | | | | |

According to table 15, in embodiment 8, the object-side surface S4 and the image-side surface S5 of the first lens E2 as well as the object-side surface S6 and the image-side surface S7 of the second lens E3 are aspheric. Table 16 below shows high-order coefficients applicable to each aspheric surface in embodiment 8, wherein, the surface shape of each aspheric lens can be defined by the formula (1) shown in embodiment 1.

TABLE 16

| Surface number | A4 | A6 | A8 | A10 | A12 |
|---|---|---|---|---|---|
| S4 | −2.6797E−02 | −7.7732E−05 | 5.4943E−04 | −1.1634E−03 | −1.3279E−03 |
| S5 | −1.7377E−01 | 1.6304E−02 | −2.6493E−03 | −5.2341E−04 | 6.3716E−04 |
| S6 | −2.8318E−01 | −8.6879E−03 | 1.2464E−03 | 1.4211E−04 | 7.2955E−04 |
| S7 | −3.6767E−03 | −6.2393E−02 | 2.4277E−02 | −7.2271E−03 | 3.6692E−03 |

| Surface number | A14 | A16 | A18 | A20 |
|---|---|---|---|---|
| S4 | 6.7968E−05 | 7.9698E−04 | 6.8741E−04 | 1.7880E−04 |
| S5 | −3.9161E−04 | 3.3966E−04 | −1.9037E−04 | 3.6608E−05 |

TABLE 16-continued

| | | | | |
|---|---|---|---|---|
| S6 | 1.2790E−04 | 1.8997E−04 | 2.3109E−05 | −6.8266E−05 |
| S7 | −7.1880E−04 | 4.8760E−04 | −1.6520E−04 | 4.3439E−05 |

In the present embodiment, f and EPD satisfy f/EPD=1.50, where f is an effective focal length of the optical system, and EPD is an entrance pupil diameter of the optical system; P and H satisfy P/H=1.41, where P is an on-axis distance from the object to the object-side surface S4 of the first lens E2, and H is an object height perpendicular to the optical axis on the glass screen; ImgH and f satisfy ImgH/f=0.81, where ImgH is half of a diagonal length of an effective pixel area on the image plane S9, and f is the effective focal length of the optical system; and CRA satisfies CRA=20.0°, where CRA is a maximum angle of a chief incident ray on the image plane.

Figure 16:
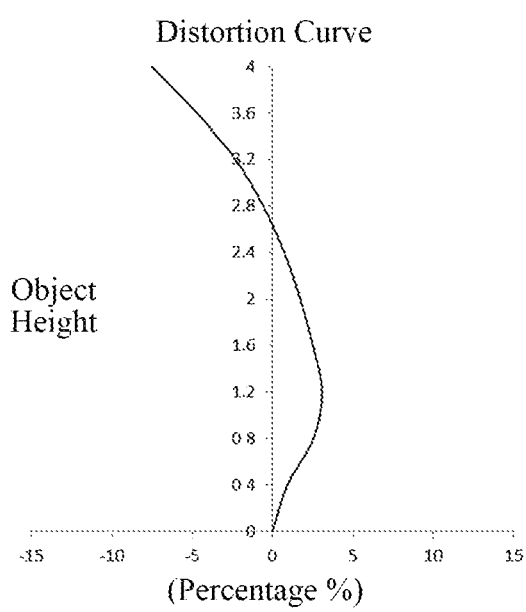
FIG. 16 illustrates a distortion curve of the optical system according to embodiment 8.

FIG. 16 illustrates a distortion curve of the optical system according to embodiment 8, representing amounts of distortion at different object heights. As can be seen from FIG. 16, the optical system in embodiment 8 can achieve good image quality.

Embodiment 9

Figure 17:
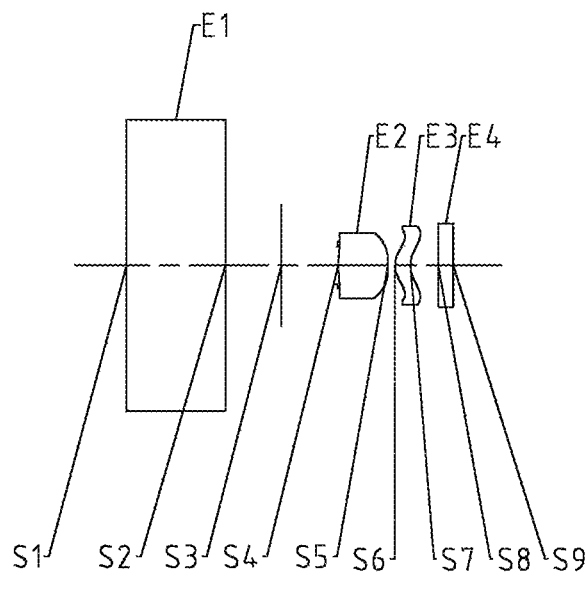
FIG. 17 illustrates a schematic structural view of an optical system according to embodiment 9 of the present disclosure.

An optical system according to embodiment 9 of the present disclosure is described below with reference to FIG. 17 and FIG. 18. FIG. 17 illustrates a schematic structural view of the optical system according to embodiment 9 of the present disclosure.

As shown in FIG. 17, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a convex surface, and an image-side surface S5 of the first lens E2 is a convex surface. An object-side surface S6 of the second lens E3 is a convex surface, and an image-side surface S7 of the second lens E3 is a concave surface. The color filter E4 has an object-side surface S8 and an image-side surface S9. Light from the object sequentially passes through the respective surfaces S1 to S9 and is finally imaged on an image plane S10 (the image plane S10 coincides with the image-side surface S9 of the color filter E4).

The optical system of the present embodiment may further include a diaphragm STO for limiting the light beam to improve the imaging quality of the optical system.

Table 17 shows surface type, radius of curvature, thickness, material and conic coefficient of each optical element of the optical system in embodiment 9, wherein the units for the radius of curvature and the thickness are millimeter (mm).

TABLE 17

| Surface number | Surface type | Radius of curvature | Thickness | Material Refractive index | Abbe number | Conic coefficient |
|---|---|---|---|---|---|---|
| OBJ | spherical | infinite | 2.8000 | | | |
| S1 | spherical | infinite | 1.5000 | 1.52 | 64.2 | 0.0000 |
| S2 | spherical | infinite | 0.8500 | | | 0.0000 |
| S3 | spherical | infinite | 0.8500 | | | 0.0000 |
| STO | spherical | infinite | 0.0123 | | | 0.0000 |
| S4 | aspheric | 1.5192 | 0.7509 | 1.55 | 56.1 | −19.3222 |
| S5 | aspheric | −5.8050 | 0.1083 | | | 1.9599 |
| S6 | aspheric | 0.3330 | 0.2345 | 1.64 | 23.5 | −0.9229 |
| S7 | aspheric | 0.4741 | 0.4208 | | | −5.4052 |
| S8 | spherical | infinite | 0.2300 | 1.52 | 64.2 | 0.0000 |
| S9 | spherical | infinite | 0.0000 | | | 0.0000 |
| S10 | spherical | infinite | | | | |

According to table 17, in embodiment 9, the object-side surface S4 and the image-side surface S5 of the first lens E2 as well as the object-side surface S6 and the image-side surface S7 of the second lens E3 are aspheric. Table 18 below shows high-order coefficients applicable to each aspheric surface in embodiment 9, wherein, the surface shape of each aspheric lens can be defined by the formula (1) shown in embodiment 1.

TABLE 18

| Surface number | A4 | A6 | A8 | A10 | A12 |
|---|---|---|---|---|---|
| S4 | −3.4146E−02 | 1.0775E−04 | 4.3441E−04 | −7.1645E−04 | −5.4995E−04 |
| S5 | −1.7117E−01 | 1.8438E−02 | −3.5502E−03 | 8.2481E−05 | 4.2605E−04 |
| S6 | −2.9189E−01 | −7.1336E−03 | −3.7498E−04 | −2.8538E−04 | 3.3155E−04 |
| S7 | −3.3619E−02 | −6.0264E−02 | 2.0668E−02 | −7.4250E−03 | 3.0810E−03 |

| Surface number | A14 | A16 | A18 | A20 |
|---|---|---|---|---|
| S4 | 4.0840E−04 | 1.2875E−04 | −1.8960E−04 | −2.6707E−04 |
| S5 | −2.5128E−04 | 2.1014E−04 | −1.5302E−04 | 4.2628E−05 |
| S6 | 1.9731E−04 | 2.1470E−04 | 6.8680E−05 | −5.8481E−05 |
| S7 | −8.3775E−04 | 4.4370E−04 | −1.9801E−04 | 1.2076E−05 |

In the present embodiment, f and EPD satisfy f/EPD=1.50, where f is an effective focal length of the optical system, and EPD is an entrance pupil diameter of the optical system; P and H satisfy P/H=1.40, where P is an on-axis distance from the object to the object-side surface S4 of the first lens E2, and H is an object height perpendicular to the optical axis on the glass screen; ImgH and f satisfy ImgH/f=0.80, where ImgH is half of a diagonal length of an effective pixel area on the image plane S9, and f is the effective focal length of the optical system; and CRA satisfies CRA=18.2°, where CRA is a maximum angle of a chief incident ray on the image plane.

Figure 18:
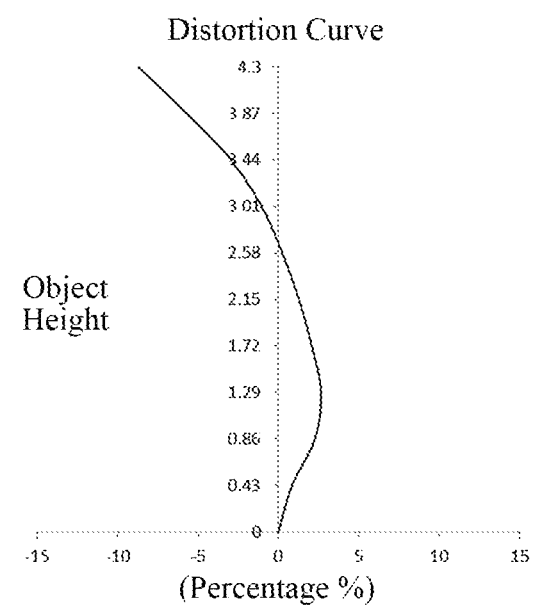
FIG. 18 illustrates a distortion curve of the optical system according to embodiment 9.

FIG. 18 illustrates a distortion curve of the optical system according to embodiment 9, representing amounts of distortion at different object heights. As can be seen from FIG. 18, the optical system in embodiment 9 can achieve good image quality.

Embodiment 10

Figure 19:
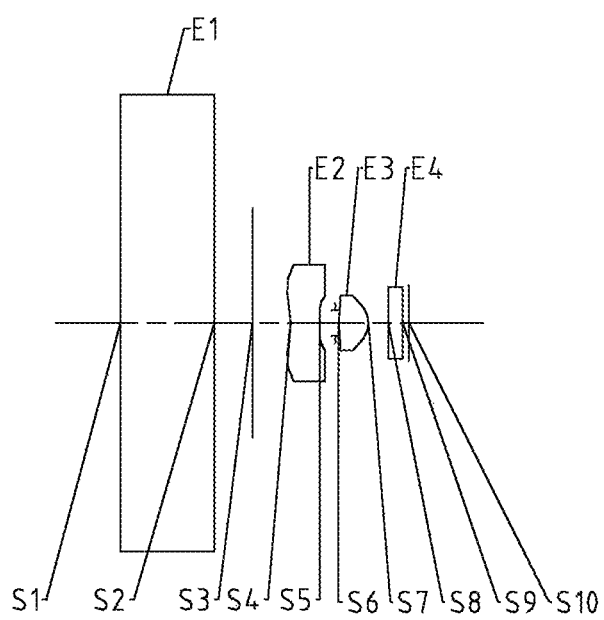
FIG. 19 illustrates a schematic structural view of an optical system according to embodiment 10 of the present disclosure.

An optical system according to embodiment 10 of the present disclosure is described below with reference to FIG. 19 and FIG. 20. FIG. 19 illustrates a schematic structural view of the optical system according to embodiment 10 of the present disclosure.

As shown in FIG. 19, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a concave surface, and an image-side surface S5 of the first lens E2 is a convex surface. An object-side surface S6 of the second lens E3 is a convex surface, and an image-side surface S7 of the second lens E3 is a convex surface. The color filter E4 has an object-side surface S8 and an image-side surface S9. Light from the object sequentially passes through the respective surfaces S1 to S9 and is finally imaged on an image plane S10.

The optical system of the present embodiment may further include a diaphragm STO for limiting the light beam to improve the imaging quality of the optical system.

Table 19 shows surface type, radius of curvature, thickness, material and conic coefficient of each optical element of the optical system in embodiment 10, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | infinite | 1.5000 | 1.52 | 64.2 | 0.0000 |
| S2 | spherical | infinite | 0.6048 | | | 0.0000 |
| S3 | spherical | infinite | 0.6120 | | | 0.0000 |
| S4 | aspheric | −0.8046 | 0.4596 | 1.55 | 56.1 | −14.4094 |
| S5 | aspheric | −2.1047 | 0.2517 | | | −20.0000 |
| STO | spherical | infinite | 0.0512 | | | 0.0000 |
| S6 | aspheric | 1.2398 | 0.4758 | 1.64 | 23.5 | −15.5589 |
| S7 | aspheric | −0.3760 | 0.3148 | | | −0.7403 |
| S8 | spherical | infinite | 0.2300 | 1.52 | 64.2 | 0.0000 |
| S9 | spherical | infinite | 0.1000 | | | 0.0000 |
| S10 | spherical | infinite | | | | |

According to table 19, in embodiment 10, the object-side surface S4 and the image-side surface S5 of the first lens E2 as well as the image-side surface S6 and the image-side surface S7 of the second lens E3 are aspheric. Table 20 below shows high-order coefficients applicable to each aspheric surface in embodiment 10, wherein, the surface shape of each aspheric lens can be defined by the formula (1) shown in embodiment 1.

TABLE 20

| Surface number | A4 | A6 | A8 | A10 | A12 | A14 | A16 |
|---|---|---|---|---|---|---|---|
| S4 | 7.0838E−01 | −1.3032E+00 | 2.0817E+00 | −2.1010E+00 | 1.3734E+00 | −4.5562E−01 | |
| S5 | 2.0310E−01 | −1.5340E−02 | −3.9068E−03 | −6.0450E−03 | | | |
| S6 | −2.1310E−02 | 3.8419E−03 | −3.4853E−03 | −2.8776E−03 | −1.4894E−03 | | |
| S7 | 4.2444E−02 | −8.8782E−04 | 7.4365E−04 | 1.9304E−03 | 1.6374E−03 | 7.6204E−04 | 3.1637E−04 |

In the present embodiment, f and EPD satisfy f/EPD=1.68, where f is an effective focal length of the optical system, and EPD is an entrance pupil diameter of the optical system; P and H satisfy P/H=0.75, where P is an on-axis distance from the object to the object-side surface S4 of the first lens E2, and H being an object height perpendicular to the optical axis on the glass screen; ImgH and f satisfy ImgH/f=1.36, where ImgH is half of a diagonal length of an effective pixel area on the image plane S10, and f is the effective focal length of the optical system; and CRA satisfies CRA=22.8°, where CRA is a maximum angle of a chief incident ray on the image plane.

Figure 20:
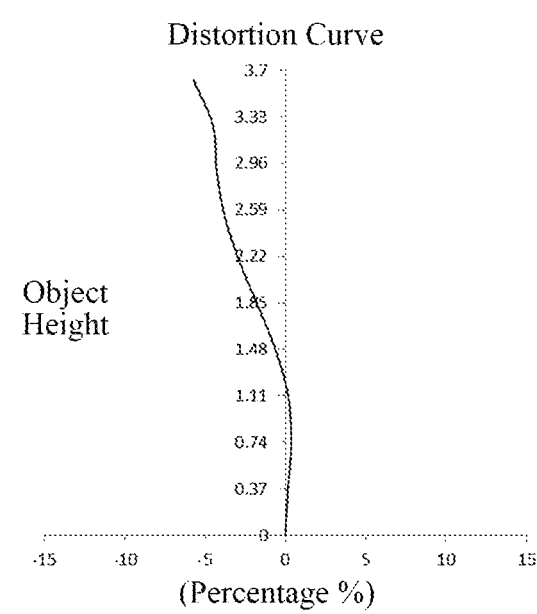
FIG. 20 illustrates a distortion curve of the optical system according to embodiment 10.

FIG. 20 illustrates a distortion curve of the optical system according to embodiment 10, representing amounts of distortion at different object heights. As can be seen from FIG. 20, the optical system in embodiment 10 can achieve good image quality.

Embodiment 11

Figure 21:
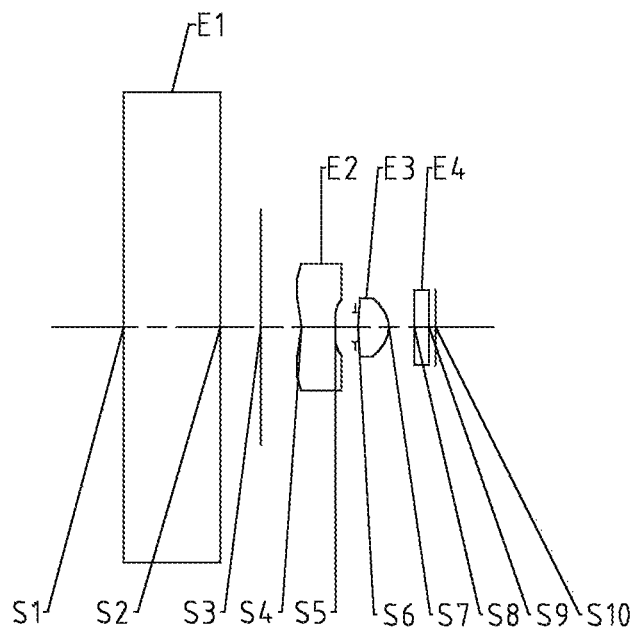
FIG. 21 illustrates a schematic structural view of an optical system according to embodiment 11 of the present disclosure.

An optical system according to embodiment 11 of the present disclosure is described below with reference to FIG. 21 and FIG. 22. FIG. 21 illustrates a schematic structural view of the optical system according to embodiment 11 of the present disclosure.

As shown in FIG. 21, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a concave surface, and an image-side surface S5 of the first lens E2 is a convex surface. An object-side surface S6 of the second lens E3 is a convex surface, and an image-side surface S7 of the second lens E3 is a convex surface. The color filter E4 has an object-side surface S8 and an image-side surface S9. Light from the object sequentially passes through the respective surfaces S1 to S9 and is finally imaged on an image plane S10.

The optical system of the present embodiment may further include a diaphragm STO for limiting the light beam to improve the imaging quality of the optical system.

Table 21 shows surface type, radius of curvature, thickness, material and conic coefficient of each optical element of the optical system in embodiment 11, wherein the units for the radius of curvature and the thickness are millimeter (mm).

TABLE 21

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | infinite | 1.5000 | 1.52 | 64.2 | 0.0000 |
| S2 | spherical | infinite | 0.6254 | | | 0.0000 |
| S3 | spherical | infinite | 0.6326 | | | 0.0000 |
| S4 | aspheric | −0.7018 | 0.5262 | 1.55 | 56.1 | −11.3626 |
| S5 | aspheric | −1.9700 | 0.3034 | | | −12.1281 |
| STO | spherical | infinite | 0.0452 | | | 0.0000 |
| S6 | aspheric | 1.2607 | 0.4802 | 1.64 | 23.5 | −15.9756 |
| S7 | aspheric | −0.4047 | 0.3928 | | | −0.7075 |
| S8 | spherical | infinite | 0.2300 | 1.52 | 64.2 | 0.0000 |
| S9 | spherical | infinite | 0.1000 | | | 0.0000 |
| S10 | spherical | infinite | | | | |

According to table 21, in embodiment 11, the object-side P surface S4 and the image-side surface S5 of the first lens E2 as well as the object-side surface S6 and the image-side surface S7 of the second lens E3 are aspheric. Table 22 below shows high-order coefficients applicable to each aspheric surface in embodiment 11, wherein, the surface shape of each aspheric lens can be defined by the formula (1) shown in embodiment 1.

TABLE 22

| Surface number | A4 | A6 | A8 | A10 | A12 | A14 | A16 |
|---|---|---|---|---|---|---|---|
| S4 | 6.2376E−01 | −1.1471E+00 | 1.9684E+00 | −2.3001E+00 | 1.5624E+00 | −4.5562E−01 | |
| S5 | 2.0758E−01 | −1.6208E−02 | −2.5348E−03 | −4.8047E−03 | | | |
| S6 | −2.8126E−02 | 6.2093E−03 | −5.5900E−03 | −5.3919E−03 | −2.4128E−03 | | |
| S7 | 4.0456E−02 | −4.9648E−03 | 2.2216E−03 | 1.9131E−03 | 1.8165E−03 | 5.9676E−04 | 4.0653E−04 |

In the present embodiment, f and EPD satisfy f/EPD=1.60, where f is an effective focal length of the optical system, and EPD is an entrance pupil diameter of the optical system; P and H satisfy P/H=0.76, where P is an on-axis distance from the object to the object-side surface S4 of the first lens E2, and H is an object height perpendicular to the optical axis on the glass screen; ImgH and f satisfy ImgH/f=1.36, where ImgH is half of a diagonal length of an effective pixel area on the image plane S10, and f is the effective focal length of the optical system; and CRA satisfies CRA=22.9°, where CRA is a maximum angle of a chief incident ray on the image plane.

Figure 22:
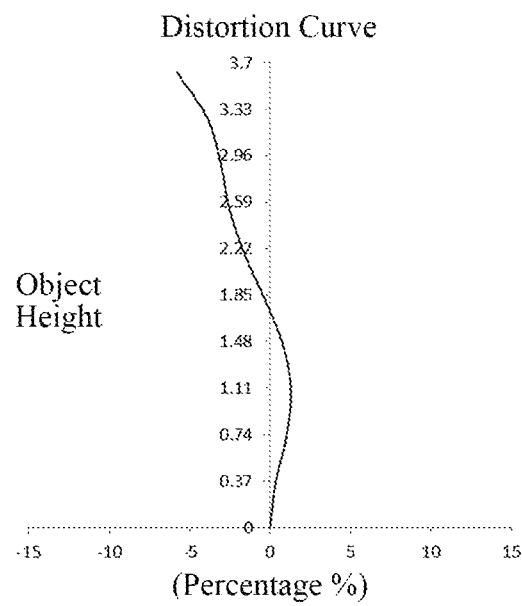
FIG. 22 illustrates a distortion curve of the optical system according to embodiment 11.

FIG. 22 illustrates a distortion curve of the optical system according to embodiment 11, representing amounts of distortion at different object heights. As can be seen from FIG. 22, the optical system in embodiment 11 can achieve good image quality.

Embodiment 12

Figure 23:
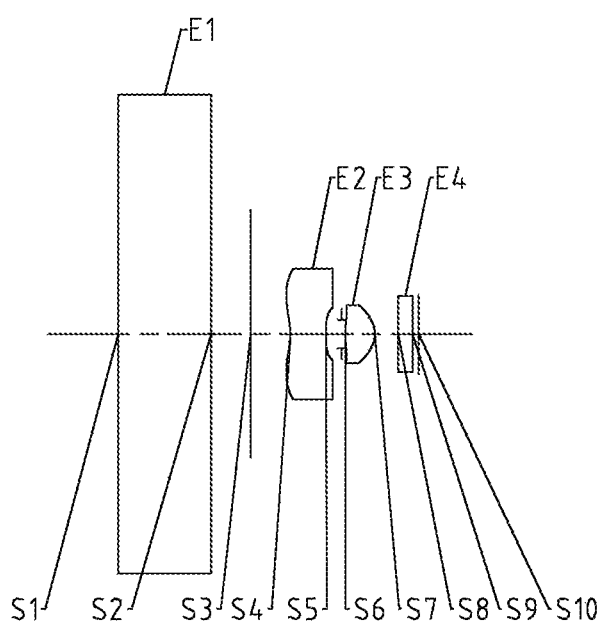
FIG. 23 illustrates a schematic structural view of an optical system according to embodiment 12 of the present disclosure.

An optical system according to embodiment 12 of the present disclosure is described below with reference to FIG. 23 and FIG. 24. FIG. 23 illustrates a schematic structural view of the optical system according to embodiment 12 of the present disclosure.

As shown in FIG. 23, the optical system according to an example implementation of the present disclosure, sequentially from an object side to an image side along an optical axis, includes: an glass screen E1, an interference screen S3, a lens group, and a color filter E4.

The glass screen E1 has an object-side surface S1 and an image-side surface S2. The lens group includes a first lens E2 and a second lens E3. An object-side surface S4 of the first lens E2 is a concave surface, and an image-side surface S5 of the first lens E2 is a convex surface. An object-side surface S6 of the second lens E3 is a convex surface, and an image-side surface S7 of the second lens E3 is a convex surface. The color filter E4 has an object-side surface S8 and an image-side surface S9. Light from the object sequentially passes through the respective surfaces S1 to S9 and is finally imaged on an image plane S10.

The optical system of the present embodiment may further include a diaphragm STO for limiting the light beam to improve the imaging quality of the optical system.

Table 23 shows surface type, radius of curvature, thickness, material and conic coefficient of each optical element of the optical system in embodiment 12, wherein the units for the radius of curvature and the thickness are millimeter (mm).

TABLE 23

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | infinite | 1.5000 | 1.52 | 64.2 | 0.0000 |
| S2 | spherical | infinite | 0.6362 | | | 0.0000 |
| S3 | spherical | infinite | 0.6435 | | | 0.0000 |
| S4 | aspheric | −0.8390 | 0.5766 | 1.55 | 56.1 | −12.9351 |
| S5 | aspheric | −2.8176 | 0.2474 | | | −20.0000 |
| STO | spherical | infinite | 0.0562 | | | 0.0000 |
| S6 | aspheric | 1.2255 | 0.4799 | 1.64 | 23.5 | −10.8465 |
| S7 | aspheric | −0.3919 | 0.3762 | | | −0.7741 |
| S8 | spherical | infinite | 0.2300 | 1.52 | 64.2 | 0.0000 |
| S9 | spherical | infinite | 0.1000 | | | 0.0000 |
| S10 | spherical | infinite | | | | |

According to table 23, in embodiment 12, the object-side surface S4 and the image-side surface S5 of the first lens E2 as well as the object-side surface S6 and the image-side surface S7 of the second lens E3 are aspheric. Table 24 below shows high-order coefficients applicable to each aspheric surface in embodiment 12, wherein, the surface shape of each aspheric lens can be defined by the formula (1) shown in embodiment 1.

TABLE 24

| Surface number | A4 | A6 | A8 | A10 | A12 | A14 | A16 |
|---|---|---|---|---|---|---|---|
| S4 | 6.0566E−01 | −1.2169E+00 | 2.1894E+00 | −2.5604E+00 | 1.6787E+00 | −4.5562E−01 | |
| S5 | 1.9699E−01 | −1.9820E−02 | −7.3242E−03 | −6.6735E−03 | | | |
| S6 | −3.1669E−02 | −7.3776E−03 | −6.7961E−03 | −2.5660E−03 | −1.1306E−03 | | |
| S7 | 4.8853E−02 | −3.8612E−03 | 3.4392E−03 | 3.0978E−03 | 3.2453E−03 | 1.2510E−03 | 6.2907E−04 |

In the present embodiment, f and EPD satisfy f/EPD=1.55, where f is an effective focal length of the optical system, and EPD is an entrance pupil diameter of the optical system; P and H satisfy P/H=0.73, where P is an on-axis distance from the object to the object-side surface S4 of the first lens E2, and H is an object height perpendicular to the optical axis on the glass screen; ImgH and f satisfy ImgH/f=1.42, where ImgH is half of a diagonal length of an effective pixel area on the image plane S10, and f is the effective focal length of the optical system; and CRA satisfies CRA=22.8°, where CRA is a maximum angle of a chief incident ray on the image plane.

Figure 24:
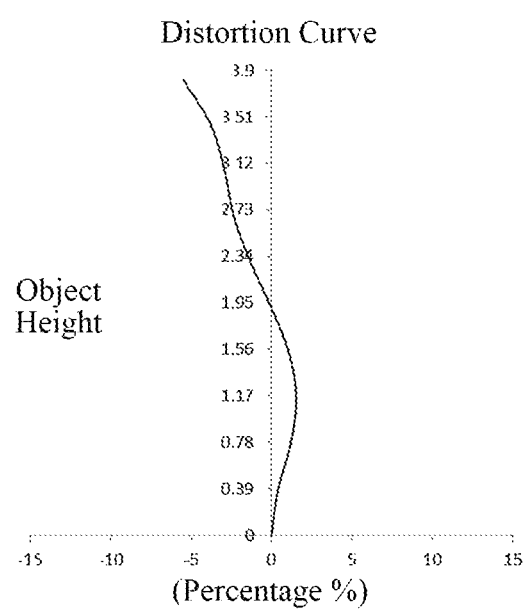
FIG. 24 illustrates a distortion curve of the optical system according to embodiment 12.

FIG. 24 illustrates a distortion curve of the optical system according to embodiment 12, representing amounts of distortion at different object heights. As can be seen from FIG. 24, the optical system in embodiment 12 can achieve good image quality.

In view of the above, embodiments 1-12 respectively satisfy the relationship shown in Table 25.

TABLE 25

| Conditional expression | embodiments | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| f/EPD | 1.70 | 1.75 | 1.68 | 1.68 | 1.75 | 1.78 | 1.50 | 1.50 | 1.50 | 1.68 | 1.60 | 1.55 |
| P/H | 0.89 | 0.89 | 0.95 | 0.95 | 0.88 | 0.93 | 1.18 | 1.41 | 1.40 | 0.75 | 0.76 | 0.73 |
| ImgH/f | 1.17 | 1.14 | 0.76 | 1.15 | 0.61 | 1.17 | 1.00 | 0.81 | 0.80 | 1.36 | 1.36 | 1.42 |
| CRA (°) | 26.2 | 34.8 | 12.6 | 19.8 | 18.5 | 27.5 | 24.9 | 20.0 | 18.2 | 22.8 | 22.9 | 22.8 |

The present disclosure further provides a fingerprint recognition apparatus. The fingerprint recognition apparatus may be an independent fingerprint recognition apparatus, or may be a fingerprint recognition module integrated in a mobile electronic device such as a mobile phone. The fingerprint recognition apparatus is equipped with the optical system described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical system, characterized in that, the optical system, sequentially from an object side to an image side along an optical axis, comprises: a glass screen, an interference screen, one lens group consisting of one or two lenses, and a color filter,
wherein a total number of lenses included in the optical system is one or two;
an effective focal length f of the optical system and an entrance pupil diameter EPD of the optical system satisfy f/EPD<1.8; and
the optical system satisfies: 0.5<ImgH/f<1.5,
where, ImgH is half of a diagonal length of an effective pixel area on an image plane of the optical system, and f is the effective focal length of the optical system.

2. The optical system according to claim 1, wherein, a ratio of
an on-axis distance from an object-side surface of the glass screen to an object-side surface of a lens among the lens group closest to the object side
to
a height of the glass screen relative to the optical axis in a direction perpendicular to the optical axis
is less than 1.5.

3. The optical system according to claim 1, wherein, the optical system satisfies: CRA≤35°,
where, CRA is a maximum angle of a chief incident ray on an image plane.

4. The optical system according to claim 1, wherein, the lens group comprises a first lens and a second lens.

5. The optical system according to claim 4, wherein, the first lens and the second lens are glued together.

6. An optical system, characterized in that, the optical system, sequentially from an object side to an image side along an optical axis, comprises: a glass screen, an interference screen, one lens group consisting of one or two lenses, and a color filter,
wherein a total number of lenses included in the optical system is one or two, and
the optical system satisfies 0.5<ImgH/f<1.5, where ImgH is half of a diagonal length of an effective pixel area on an image plane of the optical system, and f is an effective focal length of the optical system.

7. The optical system according to claim 6, wherein, the optical system satisfies: CRA≤35°,
where, CRA is a maximum angle of a chief incident ray on an image plane.

8. The optical system according to claim 6, wherein, a ratio of
an on-axis distance from an object-side surface of the glass screen to an object-side surface of a lens among the lens group closest to the object side
to
a height of the glass screen relative to the optical axis in a direction perpendicular to the optical axis
is less than 1.5.

9. A fingerprint recognition apparatus comprising the optical system of claim 1.

10. The optical system according to claim 1, wherein, 1.50≤f/EPD≤1.78.

11. The optical system according to claim 1, wherein, 0.61≤ImgH/f ≤1.42.

12. The optical system according to claim 3, wherein, 12.6°≤CRA≤34.8°.

13. The optical system according to claim 1, wherein the one or two lenses included in the lens group each having a refractive power.

14. The optical system according to claim 6, wherein, 0.61≤ImgH/f ≤1.42.

15. The optical system according to claim 7, wherein, 12.6°≤CRA≤34.8°.

16. The optical system according to claim 7, wherein, the effective focal length f of the optical system and an entrance pupil diameter EPD of the optical system satisfy $1.50 \leq f/EPD \leq 1.78$.

17. The optical system according to claim 1, wherein, the optical system, sequentially from an object side to an image side along an optical axis, consists of: a glass screen, an interference screen, one lens group consisting of one or two lenses, and a color filter.

18. The optical system according to claim 6, wherein the optical system, sequentially from an object side to an image along an optical axis, consists of: a glass screen, an interference screen, one lens group consisting of one or two lenses, and a color filter.

* * * * *